United States Patent
Ryoo et al.

(10) Patent No.: US 10,364,346 B2
(45) Date of Patent: Jul. 30, 2019

(54) ABS-BASED RESIN COMPOSITION AND METHOD ARTICLE MANUFACTURED THEREFROM

(71) Applicant: LG CHEM, LTD., Seoul (KR)

(72) Inventors: Seung Cheol Ryoo, Daejeon (KR); Soo Kyeong Lee, Daejeon (KR); Seong Lyong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 139 days.

(21) Appl. No.: 15/532,067

(22) PCT Filed: Nov. 11, 2016

(86) PCT No.: PCT/KR2016/012976
§ 371 (c)(1),
(2) Date: May 31, 2017

(87) PCT Pub. No.: WO2017/082663
PCT Pub. Date: May 18, 2017

(65) Prior Publication Data
US 2017/0260386 A1  Sep. 14, 2017

(30) Foreign Application Priority Data
Nov. 13, 2015  (KR) .......................... 10-2015-0159379

(51) Int. Cl.
| | | |
|---|---|---|
| C08L 33/20 | (2006.01) | |
| B01F 3/04 | (2006.01) | |
| C08L 25/12 | (2006.01) | |
| C08L 77/12 | (2006.01) | |
| B01D 47/16 | (2006.01) | |
| F24F 6/16 | (2006.01) | |
| C08L 55/02 | (2006.01) | |
| F24F 6/06 | (2006.01) | |

(52) U.S. Cl.
CPC .............. *C08L 33/20* (2013.01); *B01D 47/16* (2013.01); *B01F 3/04* (2013.01); *C08L 25/12* (2013.01); *C08L 77/12* (2013.01); *F24F 6/16* (2013.01); *C08L 55/02* (2013.01); *C08L 2201/04* (2013.01); *C08L 2205/03* (2013.01); *F24F 6/06* (2013.01)

(58) Field of Classification Search
CPC .................... B01F 3/04; C08L 33/20
See application file for complete search history.

(56) References Cited

U.S. PATENT DOCUMENTS

| | | | | |
|---|---|---|---|---|
| 3,625,915 A | * | 12/1971 | Gubler | .................... C08K 5/17 |
| | | | | 260/DIG. 15 |
| 5,871,823 A | * | 2/1999 | Anders | ..................... C08J 7/18 |
| | | | | 427/322 |
| 9,505,923 B2 | * | 11/2016 | Ahn | ....................... C08F 279/02 |

FOREIGN PATENT DOCUMENTS

| | | |
|---|---|---|
| CN | 101087845 A | 12/2007 |
| CN | 101248136 B | 12/2010 |
| CN | 104684985 A | 6/2015 |
| JP | S61-073753 A | 4/1986 |
| JP | 9183865 A | 7/1997 |
| JP | H10-102043 A | 4/1998 |
| JP | 2850457 B2 | 1/1999 |
| JP | 2003-238503 A | 8/2003 |
| JP | 2008-222902 A | 9/2008 |
| KR | 19950013366 B1 | 11/1995 |
| KR | 10-1999-0021569 A | 3/1999 |
| WO | WO 2014/049572 A2 | 4/2014 |

OTHER PUBLICATIONS

International Search Report for International Patent Application No. PCT/KR2016/012976, filed Nov. 11, 2016.

Office Action from Chinese Patent Office for Application No. 2016800042764, dated Dec. 3, 2018.

* cited by examiner

*Primary Examiner* — Robert A Hopkins

(57) ABSTRACT

Disclosed are an ABS-based resin composition and a molded article manufactured therefrom. More particularly, the ABS-based resin composition according to the present disclosure includes (a) 22.5 to 50% by weight of a vinyl cyan compound-conjugated diene-based rubber-like polymer-aromatic vinyl compound copolymer resin; (b) 47.5 to 75% by weight of an aromatic vinyl compound-vinyl cyan compound copolymer resin; (c) 1 to 6% by weight of a polyether ester amide resin; and (d) 1.5 to 3% by weight of an ethoxylated alkylamine-based antistatic agent, thereby providing a high humidification amount and less deformation. Accordingly, the present disclosure relates to an ABS-based resin composition suitable for application to disks for air washers, humidifiers, and the like, and a molded article manufactured therefrom.

17 Claims, No Drawings

ABS-BASED RESIN COMPOSITION AND METHOD ARTICLE MANUFACTURED THEREFROM

CROSS-REFERENCE TO RELATED APPLICATION(S)

This application is a U.S. National Stage of International Patent Application No. PCT/KR2016/012976, filed Nov. 11, 2016, which claims the priority benefit of Korean Patent Application No. 10-2015-0159379, filed on Nov. 13, 2015 in the Korean Intellectual Property Office, the disclosure of which is incorporated herein by reference.

TECHNICAL FIELD

The present disclosure relates to an ABS-based resin composition suitable for application to disks of air washers or humidifiers due to properties, such as sufficient humidification amount provision and less deformation, thereof, and a molded article manufactured therefrom. More particularly, the present disclosure relates to an ABS-based resin composition that includes an ABS-based resin, a SAN-based resin, a polyether ester amide resin, and an ethoxylated alkylamine-based antistatic agent and thus is suitable for application to disks of air washers or humidifiers due to properties, such as sufficient humidification provision and less deformation, thereof, and a molded article manufactured therefrom.

BACKGROUND ART

While conventional ultrasonic humidifiers have a water particle size of 1 to 5 μm, air washer humidifiers have a water particle size of 0.3 μm or less. Accordingly, since the sizes of water particles scattered from air washer humidifiers are smaller than those of ultrasonic humidifiers, the water particles from the air washer fly further away and serve as a cleaner that catches particles suspended in the indoor air. Due to such an advantage of purifying indoor air of air washer humidifiers, ultrasonic humidifiers are being replaced by air washer humidifiers. However, humidification efficiency of air washer humidifiers is very low because water particles are scattered by air, not by ultrasonic vibration. To compensate for such low efficiency in humidification amount, an attempt to maximize surface area by using a plurality of disks having a large diameter and a thin thickness and applying irregularities to surfaces of the disks have been made.

In the case of an air washer disk, water should be adsorbed onto a surface of the disk and then should be scattered by air. As such, when a hydrophilic resin is used as a material of a disk, moisture adsorption is satisfactorily accomplished, but the resin swells due to moisture adsorption. Accordingly, the disk may be deformed. In addition, when a hydrophobic resin is used to prevent deformation due to swelling, deformation due to swelling may be prevented, but a humidification amount is decreased due to low surface moisture adsorption rate. To compensate for such problems, a method of coating a hydrophobic resin with a glue, e.g., a hydrophilic resin, has been used. However, upon use of such a method, the hydrophilic resin is detached as use time elapses, whereby floating matter is formed, a disk surface becomes dirty, a humidifier is contaminated, and humidification efficiency is decreased. Accordingly, consumer satisfaction is decreased.

Therefore, there is a need for a resin that provides sufficient humidification and allows a disk not to be deformed due to water.

RELATED ART DOCUMENT

[Patent Document] Japanese Patent No. 2850457

DISCLOSURE

Technical Problem

Therefore, the present disclosure has been made in view of the above problems, and it is one object of the present disclosure to provide an ABS-based resin composition that provides superior impact strength and fluidity, a high humidification amount, and less deformation and thus is suitable for application to disks for air washers, humidifiers, and the like.

It is another object of the present disclosure to provide a molded article manufactured from the ABS-based resin composition.

The above and other objects can be accomplished by the present disclosure described below.

Technical Solution

In accordance with one aspect of the present disclosure, provided is an ABS-based resin composition, including: (a) 22.5 to 50% by weight of a vinyl cyan compound-conjugated diene-based rubber-like polymer-aromatic vinyl compound copolymer resin; (b) 47.5 to 75% by weight of an aromatic vinyl compound-vinyl cyan compound copolymer resin; (c) 1 to 6% by weight of a polyether ester amide resin; and (d) 1.5 to 3% by weight of an ethoxylated alkylamine-based antistatic agent.

In accordance with another aspect of the present disclosure, provided is a molded article manufactured from the ABS-based resin composition.

Advantageous Effects

As apparent from the fore-going, the present disclosure advantageously provides an ABS-based resin composition that includes a hydrophobic ABS-based resin and an aromatic vinyl compound-vinyl cyan compound copolymer resin and a hydrophilic a polyether ester amide resin and ethoxylated alkylamine-based antistatic agent, and thus, provides superior impact strength and fluidity, a high humidification amount, and less deformation to be suitable for application to disks for air washers, humidifiers, and the like, and a molded article manufactured therefrom.

[Best Mode]

Hereinafter, the present disclosure is described in detail.

An ABS-based resin composition according to the present disclosure includes (a) 22.5 to 50% by weight of a vinyl cyan compound-conjugated diene-based rubber-like polymer-aromatic vinyl compound copolymer resin; (b) 47.5 to 75% by weight of an aromatic vinyl compound-vinyl cyan compound copolymer resin; (c) 1 to 6% by weight of a polyether ester amide resin; and (d) 1.5 to 3% by weight of an ethoxylated alkylamine-based antistatic agent. Within this range, an ABS-based resin composition that provides superior impact strength and fluidity, a high humidification amount, and less deformation and thus is suitable for application to disks for air washers, humidifiers, and the like is provided.

The ABS-based resin of the present disclosure refers to a vinyl cyan compound-conjugated diene rubber-like polymer-aromatic vinyl compound copolymer resin.

In another embodiment, (a) the vinyl cyan compound-conjugated diene-based rubber-like polymer-aromatic vinyl compound copolymer resin may be included in an amount of 25 to 40% by weight, or 25 to 35% by weight. Within this range, balance among mechanical properties, such as fluidity and impact strength, is superior and thus superior bending property is provided, whereby less deformation is exhibited.

(a) The vinyl cyan compound-conjugated diene-based rubber-like polymer-aromatic vinyl compound copolymer resin may be prepared by graft-polymerizing, for example, 40 to 70% by weight of a conjugated diene-based rubber-like polymer having an average particle diameter of 2500 to 3500 Å with 18 to 48% by weight of an aromatic vinyl compound and 6 to 24% by weight of a vinyl cyan compound. Within this range, balance among mechanical properties, such as fluidity and impact strength, is superior and thus superior bending property is provided, whereby less deformation is exhibited.

In another embodiment, (b) the aromatic vinyl compound-vinyl cyan compound copolymer resin may be included in an amount of 55 to 70% by weight, or 60 to % by weight. Within this range, balance among mechanical properties, such as fluidity and impact strength, is superior and thus superior bending property is provided, whereby less deformation is exhibited.

(b) The aromatic vinyl compound-vinyl cyan compound copolymer resin may include, for example, 55 to % by weight or 60 to 75% by weight of an aromatic vinyl compound and 20 to 45% by weight or 25 to 40% by weight of a vinyl cyan compound.

The vinyl cyan compound may be one or more selected from the group consisting of, for example, acrylonitrile, methacrylonitrile, and ethacrylonitrile.

The conjugated diene-based rubber-like polymer may be one or more selected from the group consisting of, for example, a butadiene rubbery copolymer, a butadiene-styrene rubbery copolymer, and an isoprene rubbery polymer.

The aromatic vinyl compound may be one or more selected from the group consisting of, for example, styrene, α-methylstyrene, o-ethylstyrene, p-ethylstyrene, and vinyltoluene.

In another embodiment, (c) the polyether ester amide resin may be included in an amount of 1.5 to 5.5% by weight, or 2 to 4.5% by weight. Within this range, a high humidification amount is provided and superior bending property is provided, whereby less deformation is exhibited.

When (c) the polyether ester amide resin is compounded with an acrylonitrile-butadiene-styrene (hereinafter referred to as ABS) resin and injected, the polyether ester amide resin is dispersed in a layer form on a surface of the ABS resin, i.e., a layered dispersion alloy is formed. The polyether ester amide resin on a surface of the ABS resin increases surface hydrophilicity and thus increases humidification amount. In addition, the polyether ester amide resin maintains surface hydrophilicity by capturing the ethoxylated alkylamine-based antistatic agent migrating to the surface. However, since the polyether ester amide resin is stretched in a layered shape on the ABS resin surface, moisture is absorbed even in the presence of moisture and thus swelling occurs, when the polyether ester amide resin is used in a large amount. Accordingly, a disk is greatly deformed, whereby bending property is deteriorated. Therefore, the polyether ester amide resin should be included in the ABS-based resin composition within the range disclosed in the present disclosure so as to provide superior surface hydrophilicity maintenance and bending property.

(c) The polyether ester amide resin may have, for example, a specific surface resistance, which is measured according to ASTM D257, of $2\times10^9\Omega$ or less. Within this range, superior humidifying effect is provided.

(c) The polyether ester amide resin may be generated, for example, by polycondensation of a polyamide having a reactive terminal with a polyether having a reactive terminal. In a specific embodiment, a polyamide having a carboxylic acid group at both ends thereof may be polymerized with an ethylene oxide adduct of bisphenol and a melting point thereof may be 100 to 260° C., or 186 to 204° C.

(c) The polyether ester amide resin is a hydrophilic resin, and compatibility increases with increasing hydrophilicity of an aromatic vinyl compound-vinyl cyan compound copolymer resin. Accordingly, hydrophilicity increases as the content of the vinyl cyan compound in the aromatic vinyl compound-vinyl cyan compound copolymer resin increases, whereby compatibility with the polyether ester amide resin increases. Accordingly, a peeling phenomenon of the polyether ester amide resin present on a surface on the ABS resin is decreased and impact strength increases. However, since the hydrophilic polyether ester amide resin is present in a higher proportion inside the ABS resin, surface hydrophilicity is rather decreased, and thus, a humidifying property is decreased.

On the other hand, when the content of the vinyl cyan compound in the aromatic vinyl compound-vinyl cyan compound copolymer resin is low, hydrophilicity of the ABS resin is decreased and thus compatibility with the polyether ester amide resin is decreased, whereby a surface peeling phenomenon occurs and impact strength is decreased. However, since the polyether ester amide resin is easily separated from the ABS resin, the polyether ester amide resin is present in a higher proportion on a surface of the ABS resin, and thus, surface hydrophilicity increases. Accordingly, a humidifying property is improved. Therefore, with regard to hydrophilicity of the ABS resin, a peeling phenomenon from the polyether ester amide resin, impact strength, a humidifying property, and the like should be considered.

In another embodiment, (d) the ethoxylated alkylamine-based antistatic agent may be included in an amount of 1.7 to 2.5% by weight. Within this range, less deformation is exhibited, a higher humidification amount is provided, and a surface stickiness phenomenon does not occur. Accordingly, products with high value may be produced.

An alkyl group of (d) the ethoxylated alkylamine-based antistatic agent may have, for example, a carbon number of 13 to 15.

The ABS-based resin composition may further include, for example, one or more additives selected from the group consisting of a flame retardant, an anti-bacterial agent, an anti-dripping agent, a releasing agent, an antioxidant, a heat stabilizer, a lubricant, a UV stabilizer, an impact modifier, a filler, an inorganic additive, a stabilizer, a pigment, and a dye.

A humidification amount measured for six hours by means of a humidifier (LAW-A049AS, LG Electronics) that is equipped with 46 disks (circular disks) with a diameter (diameter of circle) of 215 mm and a thickness of 1.6 mm manufactured from the ABS-based resin composition may be, for example, 400 cc/hr or more, or 400 to 500 cc/hr.

In an embodiment, after respectively marking 90°, 180°, 270°, and 360° spots on a disk with a diameter of 215 mm and a thickness of 1.6 mm manufactured from the ABS-based resin composition and then immersing the air washer disk in a room-temperature water bath for 168 hours, deformation ranges of the marked spots may be 1.0 mm or less, 0.8 mm or less, or 0.1 to 0.8 mm.

In the present disclosure, room temperature is not specifically limited so long as it is a general room-temperature range understood in the art, and may be, for example, 22 to 25° C., particularly 23° C.

A method of preparing the ABS-based resin composition of the present disclosure includes a step of feeding (a) 22.5 to 50% by weight of a vinyl cyan compound-conjugated diene-based rubber-like polymer-aromatic vinyl compound copolymer resin; (b) 47.5 to 75% by weight of an aromatic vinyl compound-vinyl cyan compound copolymer resin; (c) 1 to 6% by weight of a polyether ester amide resin; and (d) 1.5 to 3% by weight of an ethoxylated alkylamine-based antistatic agent into an extruder, followed by mixing and extruding in a 180 to 220° C. barrel. The extruder may be, for example, a twin-screw extruder. In this case, superior kneading property is provided.

The present disclosure also provides a molded article manufactured from the resin composition. The molded article may be, for example, an injection-molded article. The molded article is preferably a disk, more preferably a disk assembly including a plurality of disks arranged in parallel, most preferably an air washer disk, a humidifier disk, an air purifier disk, or the like.

The disk assembly is not specifically limited so long it has a structure wherein a plurality of disks are coupled in parallel to a shaft or a supporter, and may be any products, such as a disk unit, differently named in the technical field to which the present invention pertains.

A product of the present disclosure includes a disk or disk assembly manufactured from the ABS-based resin composition.

The product may be an air washer, a humidifier, an air purifier, a humidifier-combined air washer, a humidifier-combined air purifier, or an air washer air purifier.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLES

Examples 1 to 3 and Comparative Examples 1 to 3

Ingredients summarized in the following Table 1 were fed into a supper mixer in contents as summarized in the table, followed by kneading. Subsequently, melt-kneading was carried out in a 200° C. barrel by means of a twin-screw extruder, followed by extrusion (by means of a pelletizer). As a result, pellets were obtained. The obtained pellets were injected by means of an injection molding machine to use as a specimen for property tests.

Raw materials used in the examples and comparative examples are as follows:

A (ABS graft copolymer): DP270 including 60% by weight of rubber, manufactured by LG Chemical B (SAN resin): 92 HR including 27% by weight of acrylonitrile, manufactured by LG Chemical C (polyether ester amide): MH2030 (melting point: 200° C., specific surface resistance measured according to ASTM D257: $1 \times 10^7 \Omega$) manufactured by Arkema D (ethoxylated alkylamine-based antistatic agent): Noroplast 832 manufactured by CECA Arkema

Test Example

The resin composition pellet obtained according to each of Examples 1 to 3 and Comparative Examples 1 to 3 was injected to prepare a specimen. Using the prepared specimen, a humidification amount, a deformation range, impact strength, and fluidity were measured. Measurement results are summarized in Table 1 below.

Measurement Methods

Humidification amount: A humidifier (model name: LAW-A049AS, manufactured by LG Electronics) equipped with 46 air washer disks, each of which has a diameter of 215 mm and a thickness of 1.6 mm, was subjected to an experiment for six hours and a humidification amount was measured.

Deformation range: 90°, 180°, 270°, and 380° spots on a disk were marked, and then the disk was immersed in a water bath for 168 hours. Subsequently, a deformation degree of each of the spots was measured.

Impact strength (⅛"notched, 23° C., kgf·cm/cm): Measured according to ASTM D256.

Fluidity (g/10 min): Measured under conditions of 220° C. and 10 kg according to ASTM D1238.

TABLE 1

| Classification | Example 1 | Example 2 | Example 3 | Comparative Example 1 | Comparative Example 2 | Comparative Example 3 |
|---|---|---|---|---|---|---|
| A | 30 | 30 | 30 | 30 | 30 | 24 |
| B | 65.5 | 64.5 | 63.8 | 63 | 68.5 | 62 |
| C | 2.0 | 3.5 | 4.5 | 7 | 0 | 14 |
| D | 2.5 | 2.0 | 1.7 | 0 | 1.5 | 0 |
| Humidification amount v(cc/hr) | 420 | 412 | 402 | 386 | 325 | 405 |
| Deformed range (mm) | 0.2 | 0.5 | 0.8 | 3.7 | 0.1 | 9.0 |
| Impact strength (kgf · cm/cm) | 21 | 23 | 27 | 25 | 21 | 50 |
| Fluidity (g/10 min) | 30 | 35 | 36 | 21 | 24 | 30 |

As summarized in Table 1, Examples 1 to 3 according to the present disclosure exhibit superior impact strength and fluidity, a high humidification amount, and a smaller deformation range.

On the other hand, in the case of Comparative Example 1 in which the ethoxylated alkylamine-based antistatic agent is not included, fluidity is decreased and a deformation range greatly increases. In the case of Comparative Example 2 in which the polyether ester amide resin is not included, fluidity and humidification amount are decreased. In the case of Comparative Example 3 in which the polyether ester amide resin is included in a large amount, humidification amount increases, but deformation range greatly increases.

The invention claimed is:

1. A method of preparing an ABS-based resin composition, the method comprising: a step of feeding (a) 22.5 to 50% by weight of a vinyl cyan compound-conjugated diene-based rubber-like polymer-aromatic vinyl compound copolymer resin, wherein (a) the vinyl cyan compound-conjugated diene-based rubber-like polymer-aromatic vinyl compound copolymer resin is prepared by graft-polymerizing 40 to 70% by weight of a conjugated diene-based rubber-like polymer having an average particle diameter of 2500 to 3500 Å with 8 to 48% by weight of an aromatic vinyl compound and 6 to 24% by weight of a vinyl cyan compound; (b) 47.5 to 75% by weight of an aromatic vinyl compound-vinyl cyan compound copolymer resin; (c) 1 to 6% by weight of a polyether ester amide resin; and (d) 1.5 to 3% by weight of an ethoxylated alkylamine-based antistatic agent into an extruder, followed by mixing and extruding in a 180 to 220° C. barrel.

2. The method according to claim 1, wherein (c) the polyether ester amide resin is generated by polycondensation of a polyamide having a reactive terminal with a polyether having a reactive terminal.

3. The method according to claim 1, wherein a humidification amount measured for six hours by means of a humidifier (LAW-A049AS, LG Electronics) that is equipped with 46 disks with a diameter of 215 mm and a thickness of 1.6 mm manufactured from the ABS-based resin composition is 400 cc/hr or more.

4. The method according to claim 1, wherein, after marking 90°, 180°, 270°, and 360° spots on an air washer disk with a diameter of 215 mm and a thickness of 1.6 mm manufactured from the ABS-based resin composition and then immersing the air washer disk in a water bath for 168 hours, deformation ranges of the marked spots are 1.0 mm or less.

5. A molded article manufactured from the method according to claim 1.

6. A product comprising a disk or disk assembly manufactured from the method according to claim 1.

7. The product according to claim 6, wherein the product is an air washer, a humidifier, an air purifier, a humidifier-combined air washer, a humidifier-combined air purifier, or an air washer air purifier.

8. The method according to claim 1, wherein (b) the aromatic vinyl compound-vinyl cyan compound copolymer resin comprises 55 to 80% by weight of an aromatic vinyl compound and 20 to 45% by weight of a vinyl cyan compound.

9. The method according to claim 1, wherein the vinyl cyan compound is one or more selected from the group consisting of acrylonitrile, methacrylonitrile, and ethacrylonitrile.

10. The method according to claim 1, wherein the conjugated diene-based rubber-like polymer is one or more selected from the group consisting of a butadiene rubbery copolymer, a butadiene-styrene rubbery copolymer, and an isoprene rubbery polymer.

11. The method according to claim 1, wherein the aromatic vinyl compound is one or more selected from the group consisting of styrene, α-methylstyrene, o-ethylstyrene, p-ethylstyrene, and vinyltoluene.

12. The method according to claim 1, wherein an alkyl group of (d) the ethoxylated alkylamine-based antistatic agent has a carbon number of 13 to 15.

13. The method according to claim 1, wherein the ABS-based resin composition further comprises one or more additives selected from the group consisting of a flame retardant, an anti-bacterial agent, an anti-dripping agent, a releasing agent, an antioxidant, a heat stabilizer, a lubricant, a UV stabilizer, an impact modifier, a filler, an inorganic additive, a stabilizer, a pigment, and a dye.

14. An apparatus comprising:
a molded disk assembly comprising a plurality of disks arranged in parallel and formed from an ABS-based resin composition, comprising:
(a) 22.5 to 50% by weight of a vinyl cyan compound-conjugated diene-based rubber-like polymer-aromatic vinyl compound copolymer resin;
(b) 47.5 to 75% by weight of an aromatic vinyl compound-vinyl cyan compound copolymer resin;
(c) 1 to 6% by weight of a polyether ester amide resin; and
(d) 1.5 to 3% by weight of an ethoxylated alkylamine-based antistatic agent.

15. The apparatus of claim 14 wherein the plurality of disks comprise air washer disks.

16. The apparatus of claim 14 wherein the plurality of disks comprise humidifier disks or air purifier disks.

17. The apparatus of claim 14 wherein the plurality of disks are coupled in parallel to a shaft or a supporter.

* * * * *